United States Patent

Prudence

[11] 4,230,841
[45] Oct. 28, 1980

[54] PROCESS FOR MEDIUM VINYL POLYBUTADIENE

[75] Inventor: Robert T. Prudence, Akron, Ohio

[73] Assignee: The Goodyear Tire & Rubber Company, Akron, Ohio

[21] Appl. No.: 7,741

[22] Filed: Jan. 31, 1979

[51] Int. Cl.³ .................... C08F 236/06; C08F 36/06; C08F 4/48

[52] U.S. Cl. .................................. 526/179; 526/180; 526/181

[58] Field of Search ...................... 526/180, 179, 181

[56] References Cited

U.S. PATENT DOCUMENTS

| | | | |
|---|---|---|---|
| 3,451,988 | 6/1969 | Langer | 526/180 |
| 3,935,177 | 1/1976 | Muller et al. | 526/180 |
| 3,966,691 | 6/1976 | Halasa | 526/180 |
| 4,022,959 | 5/1977 | Sommer | 526/180 |
| 4,085,265 | 4/1978 | Otsuki et al. | 526/180 |

Primary Examiner—William F. Hamrock
Attorney, Agent, or Firm—J. Y. Clowney

[57] ABSTRACT

There is disclosed a process for the preparation of medium vinyl polybutadiene which comprises copolymerizing butadiene with small amounts of divinylbenzene in a hydrocarbon solvent system employing as a catalyst an alkyl lithium compound which has been modified by mixtures of polar compounds, at least one of which polar compound is selected from the group consisting of hexamethylphosphoric acid triamide (HMPA), N,N,N'N'-tetramethylethylene diamine (TMEDA), ethylene glycol dimethyl ether (glyme), diethylene glycol dimethyl ether (diglyme), triethylene glycol dimethyl ether (triglyme) and tetraethylene glycol dimethyl ether (tetraglyme), and at least one of which polar compound is selected from the group consisting of tetrahydrofuran (THF), 1,4diazabicyclo [2.2.2] octane (DABCO), diethyl ether, triethylamine, tri-n-butylamine, tri-n-butylphosphine and p-dioxane, in which the temperature is maintained constant throughout the polymerization.

4 Claims, 4 Drawing Figures

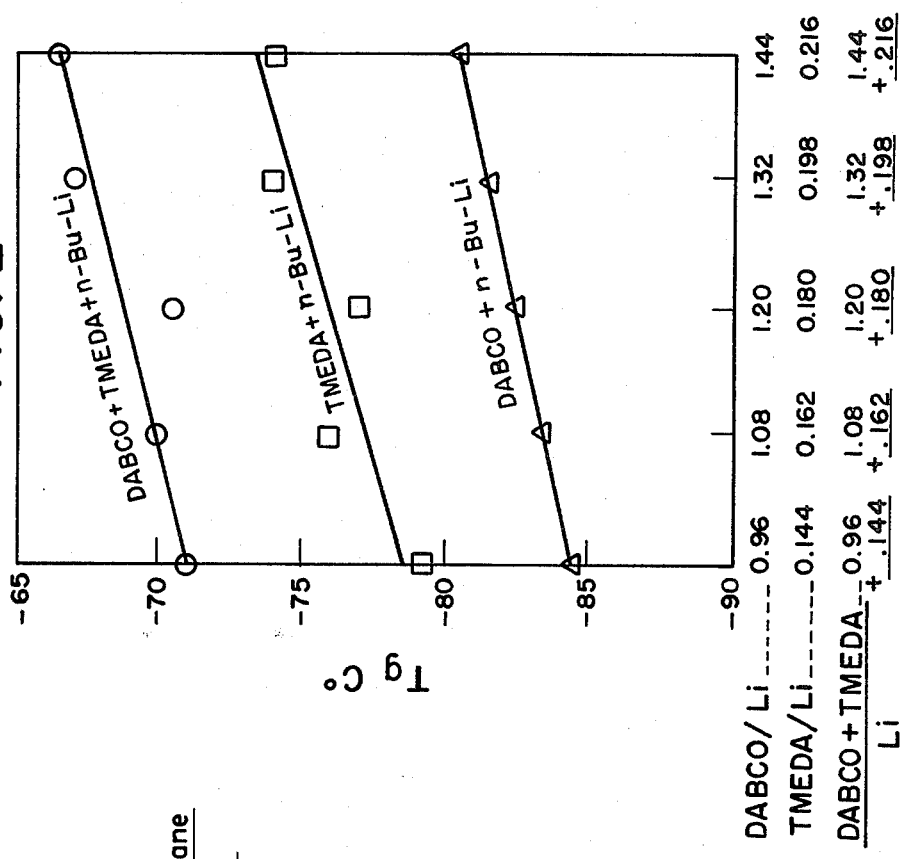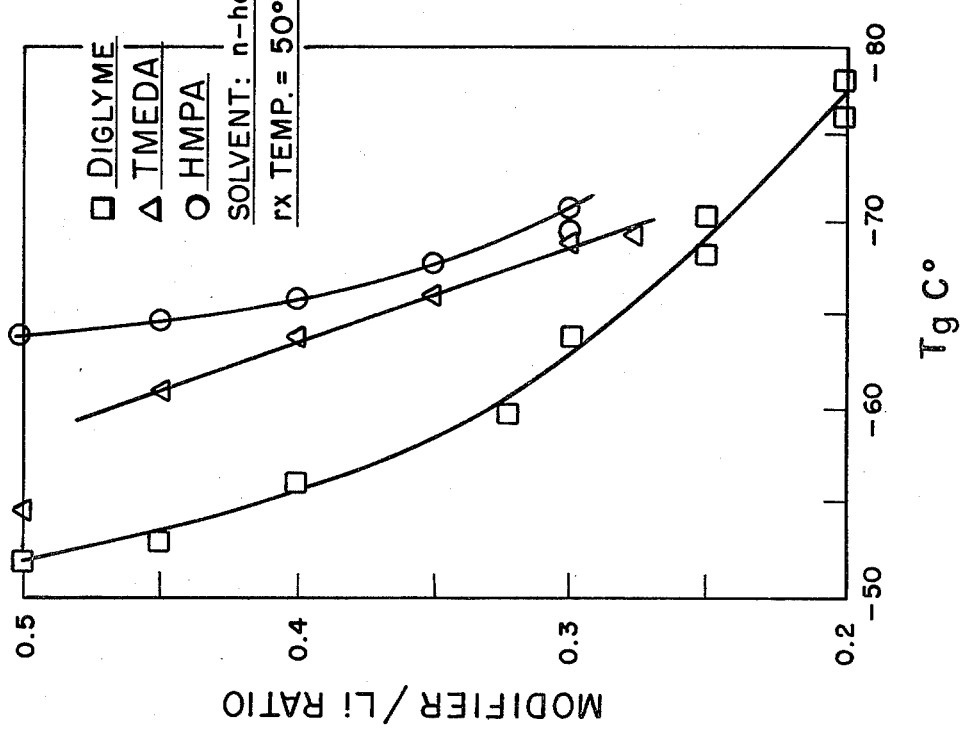

PROCESS FOR MEDIUM VINYL POLYBUTADIENE

TECHNICAL FIELD

This invention is directed to a method of preparing a randomly branched easily processed medium vinyl polybutadiene by copolymerizing butadiene with divinylbenzene using an alkyl-lithium catalyst modified with at least two dissimilar polar compounds.

BACKGROUND OF THE INVENTION

Recently, several medium vinyl polybutadienes (MVPBd) have been offered commercially. Because these polybutadienes have about 30 to 40% 1,2-polybutadiene (vinyl) microstructure, they have a glass transition temperature ($T_g$) of approximately $-70°$ C. This $T_g$ is close to that of emulsion SBR. Likewise, the behavior of the MVPBd's is similar to that of emulsion SBR when compounded and cured.

The purpose of this invention is to outline an improved process for making a novel MVPBd which could compete with the commercial MVPBd's as well as emulsion SBR.

Since MVPBd requires no styrene, its cost and availability is independent of styrene. Should the benzene (and hence styrene) shortage occur again or the price differential between butadiene and styrene increase, MVPBd would offer a relatively inexpensive, available replacement for either solution or emulsion SBR.

The use of polar catalyst modifier with alkyl-lithium has been investigated. (T A Antkowiak, A E Oberster, A F Halasa and D P Tate, J. Poly. Sci., A-1, 10, 1319; 1972.) It is known that the vinyl content of the MVPBd is proportional to the ratio of polar catalyst modifier to active alkyl-lithium and inversely proportional to the reaction temperature at constant catalyst and modifier level.

However, detailed reports on the subject make no mention of the possibility of using more than a single catalyst modifier or the possible results of doing so.

A well known characteristic of virtually all anionic polymerizations conducted with alkyl-lithium catalysts is the low heterogeneity index ($H_i$) of the resulting polymer. This is true for the MVPBds also. These relatively monodisperse polymers are uniformly poor in processing. As a result, a variety of techniques have been employed to improve the processability of the MVPBds.

One of these techniques involves the production of block polymers of the form A-B wherein the A-block is polybutadiene having a high (about 90%) 1,4-polybutadiene microstructure and the B-block is high enough (about 70%) in 1,2 or vinyl content so that the resulting polymer has a net vinyl content of 40 to 50%.

The simplest approach to improving the processability of the polymer via this technique involves polymerizing the butadiene to about 50% conversion in the absence of any polar catalyst modifiers and then adding a relatively large amount of some material such as tetrahydrofuran, glyme or diglyme. (Brit. Pat. No. 1,231,657, May 12, 1971 and U.S. Pat. No. 3,301,840, Jan. 31, 1967.)

Alternatively, that segment of the block polymer having a high vinyl content may be produced first using a catalyst modifier such as N,N,N',N-tetramethylethylene diamine (TMEDA) which is then reduced in its activity by adding, at about 50% conversion, a complexing agent such as diethyl-zinc (U.S. Pat. No. 3,830,880, Aug. 20, 1974.) Another approach to the same product involves allowing the butadiene to completely polymerize using an unmodified alkyl-lithium catalyst and then adding fresh monomer and a polar catalyst modifier to the still "living" reaction. (U.S. Pat. No. 3,140,278, July 7, 1964.)

Another MVPBd which also contains about 40% vinyl polybutadiene differs in structure in that the vinylpolybutadiene is not uniformly distributed throughout the polymer chain. That is, the vinyl content increases gradually from one end of the polymer chain to the other rather than radically as in the A-B block MVPBds. These are termed "tapered" polymers. Since the effectiveness of the polar catalyst modifier is inversely proportional to the reaction temperature, it is possible to produce a tapered MVPBd by simply allowing the reaction to exotherm. (Brit. Pat. No. 1,320,945 June 20, 1973 and U.S. Pat. No. 3,829,409, Aug. 13, 1974.) The improved processability of this polymer might be explained by the branching through alkylation which would be expected at the final elevated temperatures (125° C.=247° F.) reported by patentees for their process.

This same phenomenon has been exploited for high 1,4-polybutadiene where a temperature of 315° F. (157° C.) is reported. (U.S. Pat. No. 3,629,223, Dec. 21, 1971.) Since the polar catalyst modifiers increase the reactivity of the polybutadienyl-lithium chain ends, it would be expected that alkylation (branching) could occur at the lower temperatures reported in U.S. Pat. No. 3,829,409.

SUMMARY OF THE INVENTION

A process for the preparation of medium vinyl polybutadiene which comprises copolymerizing butadiene with small amounts of divinylbenzene in a hydrocarbon solvent system employing as a catalyst an alkyl lithium compound which has been modified by mixtures of polar compounds, at least one of which polar compound is selected from the group consisting of hexamethylphosphoric acid triamide (HMPA), N,N,N'N'-tetramethylethylene diamine (TMEDA), ethylene glycol dimethyl ether (glyme), diethylene glycol dimethyl ether (diglyme), triethylene glycol dimethyl ether (triglyme) and tetraethylene glycol dimethyl ether (tetraglyme), and at least one of which polar compound is selected from the group consisting of tetrahydrofuran (THF), 1,4-diazabicyclo[2.2.2]octane (DABCO), diethyl ether, triethylamine, tri-n-butylamine, tri-n-butylphosphine and p-dioxane, in which the temperature is maintained constant throughout the polymerization.

DETAILED DESCRIPTION OF THE INVENTION

Figure 3:
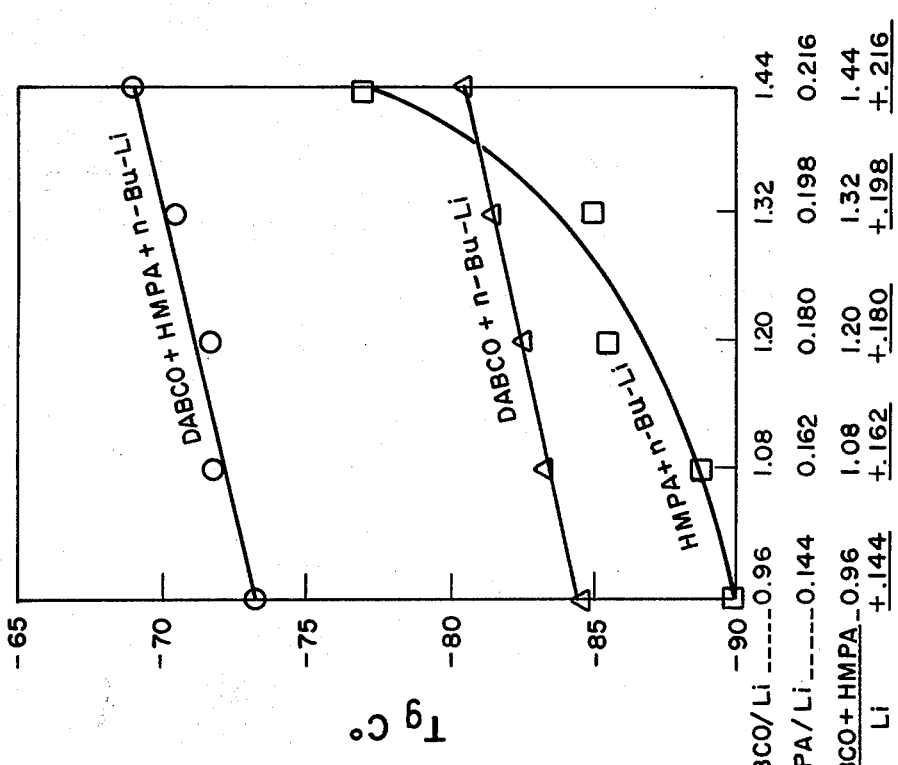

The alkyl lithium catalyst employed in the present invention can be any alkyl lithium compound, representative of which is methyl lithium, ethyl lithium, propyl lithium, n-butyl lithium, which is the preferred species, secondary butyl lithium, tertiary butyl lithium, amyl lithium and other available alkyl lithium compounds.

The amount or level of the alkyl lithium catalyst is actually determined by the molecular weight desired for the final polymer. Usually, the higher the catalyst level the lower molecular weight of the final polymer. Generally, however, in the practice of the invention, between about 0.10 and 1.0 millimoles of active alkyl lithium per hundred grams of butadiene is a satisfactory amount. Since the polymer's Mooney viscosity ultimately is determined by the catalyst level employed and a variety of desirable Mooney values may exist, no one level of catalyst can be specified as being preferred.

The amount of divinylbenzene (DVB) employed is determined by the level of the active lithium catalyst. It has been determined that a mole ratio of DVB to alkyl lithium which is employed may range from about 0.10 to about 0.90. It has been determined that a mole ratio of DVB to alkyl lithium between about 0.5 and 0.6 is most preferred.

Since the medium vinyl polybutadienes are made in a solution polymerization process, a solvent system is required. Any non-polar aprotic hydrocarbon such as pentane, hexane, heptane, octane, isooctane, cyclohexene or even benzene may be employed. It is preferable to employ hexane as a solvent.

The temperatures employed are those normally employed in solution polymerization techniques. Thus, any temperature which gives a convenient polymerization rate is usually acceptable. However, since it is necessary to use a greater level of the catalyst modifier to maintain the same level of vinyl content with increasing reaction temperatures, temperatures between about 50° C. to about 80° C. are preferred. If the operation is to be conducted as a batch operation, temperatures in the range of about 50° C. give satisfactory results. If the operation is to be a continuous operation, slightly higher temperature is desirable, such as 70° to 80° C.

The polar catalyst modifiers, as has been indicated, require at least two different polar compounds to be employed as the modifiers. For descriptive purposes these catalyst modifiers have been classified either as weak or strong, depending upon their relative effect upon the vinyl content of the resulting polybutadiene.

The weak catalyst modifiers are those such as tetrahydrofuran (THF), 1,4-diazabicyclo[2.2.2]octane (DABCO), diethyl ether, triethylamine, tri-n-butylamine, tri-n-butylphosphine and p-dioxane. The strong modifiers employed in the present invention which are mixed with the weak modifiers are hexamethyl phosphoric acid triamide (HMPA), N,N,N',N'-tetramethylethylene diamine (TMEDA), ethylene glycol dimethyl ether (glyme), diethylene glycol dimethyl ether (diglyme), triethylene glycol dimethyl ether (triglyme) and tetraethylene glycol dimethyl ether (tetraglyme).

The amount of alkyl lithium catalyst modifier employed to prepare the MVPBD will depend on the 1,2 content desired in the polybutadiene. It has been determined that a randomly branched polybutadiene produced according to the process of this invention should have a vinyl content ranging between about 15% to about 65% 1,2 microstructure. Thus, the absolute amount of the strong modifier and the absolute amount of the weak modifier as well as the ratio of the strong modifier to the weak modifier will depend on the 1,2 content of the polybutadiene desired. In an experiment TMEDA was used as the strong modifier and DABCO was used as the weak modifier, at respective mole ratios to the active alkyl lithium of 0.162/1.08/1.0 and the reaction temperature held constant at 50° C. This combination of modifier produced MVPBD having about a 40% vinyl content. Generally the mole ratio of strong modifier to the alkyl lithium ranges between about 0.15/1 and 0.50/1. The corresponding mole ratio for the weak modifier to the alkyl lithium should range between about 0.90/1 to about 1.50/1. It should be understood that the amount of strong and weak modifiers used and their respective ratios to the alkyl lithium are determined by the amount of vinyl content desired in the final MVPBD's.

As a guide, when a typical constant reaction temperature polymerization in which 50 kg of butadiene in 300 kg of hexane were polymerized with 78 grams of DVB with n-butyl lithium at 50° C., the following table should be of extreme value in determining the amounts of modifier employed.

| Moles strong modifier | | Moles weak modifier | | Moles n-bu-li | $T_g$°C. |
|---|---|---|---|---|---|
| TMEDA | 0.162 | DABCO | 1.08 | 1.00 | −70.0 |
| TMEDA | 0.216 | THF | 2.88 | 1.00 | −70.0 |
| HMPA | 0.216 | DABCO | 1.44 | 1.00 | −69.0 |

The invention can be further illustrated by reference to FIGS. 1, 2, 3 and 4. In FIGS. 1, 2, 3 and 4, identical polymerizations were conducted as follows:

A solution of 2500 cc of n-hexane was placed in a suitable vessel and there was added 500 cc of liquid butadiene, giving a total volume of 3 liters. This mixture was passed through a silica gel column into a connecting vessel, all being blanketed under nitrogen. A 165 cc portion of this solution containing 15 grams (g) of butadiene was placed in a series of 8-oz bottles under nitrogen. The various modifiers were added to give the modifier/lithium mole ratio as indicated in FIGS. 1, 2, 3 and 4. After the modifiers were added, 0.6 cc of the n-butyllithium at a normality of 0.35 in n-hexane was added to each bottle. The polymerizations were continued at 50° C. for a period of 2.5 hours at which time they were terminated, the polymers isolated, dried and the glass transition temperature determined in a conventional manner.

Figure 4:
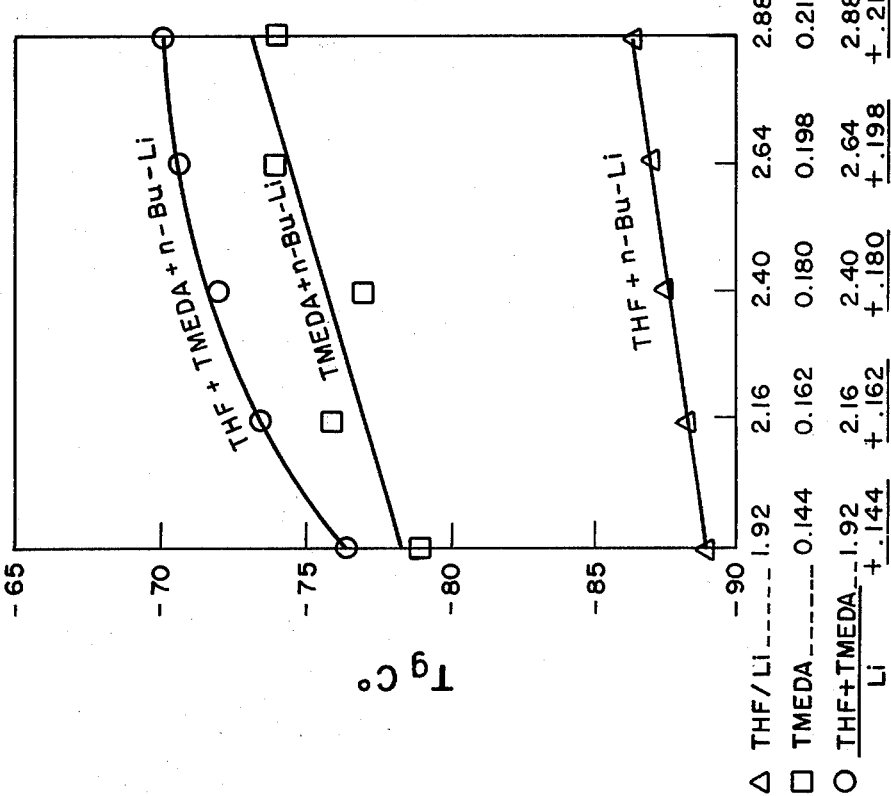

We have found that vary small changes in the ratio of polar modifier to active alkyl-lithium will cause a very drastic change in the vinyl content of the polymer. This is best illustrated with reference to FIG. 1. Since all of the alkyl-lithium catalysts are very sensitive to adventitious impurities in the reaction (oxygen, water, acetylenes etc.) substantial variations would be expected in the MVPBd microstructure due to the fluctuation in modifier to active alkyl-lithium ratio with changing impurity level in the butadiene/solvent mixture when a single polar modifier is used. Our dual modifier system circumvents this problem since it is not nearly as sensitive to changes in the combined modifier to active alkyl-lithium ratio. Reference to FIGS. 2, 3 and 4 graphically illustrate this point for the combined modifiers DABCO+TMEDA, DABCO+HMPA and THF+TMEDA, respectively. To that extent, our dual modifier system represents both an unexpected result and a novel improvement over previously documented approaches to an easily processed MVPBd.

A further difference between our MVPBd and those which have been patented is the uniform distribution of the vinyl-polybutadiene throughout the polymer chain. This is accomplished by maintaining a constant reaction temperature and adding all of the catalyst modifier at the beginning of the reaction.

Still a further distinction between our material and the earlier products is the random branching which is produced by the DVB. While the use of DVB as a branching agent is no novelty with regard to alkyl-lithium catalyzed polybutadiene (U.S. Pat. No. 3,363,659, Jan. 16, 1968), it is a novelty in MVPBd. The difficulties of using DVB in MVPBd were tacitly acknowledged in the Firestone patent (col. 2, lines 21–22) when they stated that the polymer they were concerned with should contain ". . . not in excess of about 10% 1,2 structure, as determined by infrared analysis." This restriction is further stated in #1, 4, 5, and 6 of U.S. Pat. No. 3,363,659. The reason for this restriction can best be understood in light of our experimental work and the working examples in Tables II and III of said patent. The mole ratio of DVB to alkyl-lithium calculates out to 5.1, 10.2, 15.2 and 20.3 for examples B through E in Table II and 5.07, 12.7 and 25.4 for B through D in Table III. A 5/1 ratio is the minimum value shown which produces the desired reduction in cold flow and presumed improved processing in their high 1,4-polybutadiene.

We have found that mole ratios exceeding about 1.1 produce intractable gel in the MVPBd. Hence, our preferred range in mole ratio of DVB to active alkyl-lithium is about 0.50 to 0.60. Within this range, we have been unable to produce gelation, under normal operating conditions. This is an unexpected result insofar as the U.S. Pat. No. 3,363,659 patent implies that DVB could not be used with MVPBd.

The branching produced by DVB in our polymers is superior to that which may be taking place in the prior art processes in that our process is far easier to regulate. DVB, when used in the specified amounts, does not terminate any of the reactive polybutadienyl-lithium chain ends, and does not induce trans-metallation, both of which would present a problem when relying upon the high exotherm to induce branching via alkylation.

The invention is further illustrated by reference to the following example which is intended to be representative rather than restrictive of the scope of this invention.

A 2100 ml solution containing 209 g butadiene in dry hexane was continuously pumped through a well stirred reactor maintained at 65° C. at a rate of 2000 ML/100 min. The catalyst, 0.122 N n-Bu-li, was simultaneously added at the rate of 2.0 ml/min. This catalyst level is sufficient to eliminate residual impurities in the butadiene/hexane solution and produce the desired polymer molecular weight. At the same time TMEDA, DABCO and DVB were pumped continuously into the reactor at such a rate as to maintain their mole ratios of 0.4/1.4/0.5 respectively with regard to active n-butyl-lithium. The conversion was between 80 and 90% for each 100 min cycle. The polymer had a DSV of 3.06, Mooney of 99, a $T_g$ of −75° C. and a vinyl content of 32%.

While certain representative embodiments and details have been shown for the purpose of illustrating the invention, it will be apparent to those skilled in this art that various changes and modifications may be made therein without departing from the spirit or scope of the invention.

I claim:

1. A process for the preparation of medium vinyl polybutadiene which comprises copolymerizing butadiene with small amounts of divinylbenzene in a hydrocarbon solvent system employing as a catalyst an alkyllithium compound, which process has been modified by mixtures of polar compounds, at least one of which is a strong polar compound and is selected from the group consisting of hexamethylphosphoric acid triamide (HMPA), N,N,N'N'-tetramethylethylene diamine (TMEDA), ethylene glycol dimethyl ether (glyme), diethylene glycol dimethyl ether (diglyme), triethylene glycol dimethyl ether (triglyme) and tetraethyleneglycol dimethyl ether (tetraglyme), in which the mole ratio of the strong polar compound to the alkyllithium ranges between about 0.15/1 and 0.50/1, and at least one of which is a weak polar compound and is selected from the group consisting of tetrahydrofuran (THF), 1,4-diazobicyclo[2.2.2]octane (DABCO), diethylether, triethylamine, tri-n-butylamine, tri-n-butylphosphine and p-dioxane, in which the mole ratio of the weak polar compound to the alkyllithium ranges between about 0.90/1 to about 1.50/1, in which the temperature is maintained constant throughout the polymerization and in which the mole ratio of the divinylbenzene to active alkyllithium catalyst ranges between about 0.10 and about 0.90, and in which the amount of alkyllithium catalyst is between about 0.10 and 1.0 millimoles of active alkyllithium per hundred grams of butadiene.

2. The process according to claim 1 in which one catalyst modifier is N,N,N'N'-tetramethylene diamine and the other catalyst modifier is tetrahydrofuran or one catalyst modifier is N,N,N'N'-tetramethylene diamine and the other catalyst modifier is 1,4-diazabicyclo[2.2.2]octane or one catalyst modifier is hexamethylphosphoric acid triamide and the other catalyst modifier is 1,4-diazabicyclo[2.2.2]octane.

3. A randomly branched medium vinyl polybutadiene wherein the vinyl content of said polybutadiene is between 15 and 65 percent 1,2 microstructure prepared in accordance with claim 1.

4. A randomly branched medium vinyl polybutadiene wherein the vinyl content of the polybutadiene lies between 25 and 40 percent 1,2 microstructure prepared in accordance with claim 2.

* * * * *